United States Patent
Sagi et al.

(10) Patent No.: US 9,921,126 B2
(45) Date of Patent: Mar. 20, 2018

(54) LARGE VOLUME TEST APPARATUSES AND METHODS FOR DETECTION OF SMALL DEFECTS

(71) Applicant: Advanced Test Concepts, LLC, Indianapolis, IN (US)

(72) Inventors: Nehemia Sagi, Carmel, IN (US); Oleksandr Ivanchenko, Indianapolis, IN (US); George Lawrence Bishop, III, Westfield, IN (US)

(73) Assignee: Advanced Test Concepts, LLC, Indianapolis, IN (US)

( * ) Notice: Subject to any disclaimer, the term of this patent is extended or adjusted under 35 U.S.C. 154(b) by 82 days.

(21) Appl. No.: 14/841,134

(22) Filed: Aug. 31, 2015

(65) Prior Publication Data

US 2017/0059444 A1  Mar. 2, 2017

(51) Int. Cl.
*G01M 3/26* (2006.01)
*G01M 3/22* (2006.01)
*G01M 3/32* (2006.01)
*G01M 3/02* (2006.01)

(52) U.S. Cl.
CPC .............. *G01M 3/26* (2013.01); *G01M 3/02* (2013.01); *G01M 3/3254* (2013.01); *G01M 3/3281* (2013.01)

(58) Field of Classification Search
CPC ............. G01M 3/3254; G01M 3/3281; G01M 3/2815; G01M 3/02; G01M 3/26; G01M 3/3218
See application file for complete search history.

(56) References Cited

U.S. PATENT DOCUMENTS

| | | | | |
|---|---|---|---|---|
| 3,022,658 A | * | 2/1962 | Black | G01M 3/2876 73/40 |
| 3,807,219 A | * | 4/1974 | Wallskog | G01M 3/26 73/40 |
| 4,051,715 A | * | 10/1977 | Ledeen | G01M 3/2815 137/12 |
| H001045 H | * | 5/1992 | Wilson | G01M 3/06 73/40 |
| 5,585,549 A | * | 12/1996 | Brevick | G01M 15/00 73/118.02 |
| 5,708,193 A | * | 1/1998 | Ledeen | G01M 3/243 73/40 |
| 5,913,236 A | * | 6/1999 | Wodeslavsky | F24D 19/1006 137/312 |
| 6,308,556 B1 | * | 10/2001 | Sagi | G01M 3/3254 73/40 |

(Continued)

*Primary Examiner* — David A Rogers
(74) *Attorney, Agent, or Firm* — Faegre Baker Daniels LLP

(57) ABSTRACT

A system for detecting leaks is provided comprising an accumulator, a flow controller in communication with the accumulator, and a flow meter/sensor in communication with the accumulator, the flow controller and a UUT. The flow meter is structured to supply gas from the accumulator to the UUT and measure a flow rate of the supplied gas, the flow meter providing feedback to the flow controller representing the flow rate, and the flow controller responding to the feedback by supplying flow compensation gas to the accumulator to maintain a desired pressure in the accumulator. Methods are also provided for detecting small leaks, especially with large units under test ("UUTs").

24 Claims, 3 Drawing Sheets

(56) References Cited

U.S. PATENT DOCUMENTS

| | | | |
|---|---|---|---|
| 6,584,828 B2* | 7/2003 | Sagi | G01M 3/04 73/40 |
| 6,854,318 B2* | 2/2005 | Sagi | G01M 3/04 73/40 |
| 7,587,929 B2* | 9/2009 | Zielinski | A62B 27/00 73/46 |
| 2001/0003917 A1* | 6/2001 | Sagi | G01M 3/04 73/40 |
| 2002/0157455 A1* | 10/2002 | Sagi | G01M 3/04 73/40 |
| 2004/0168505 A1* | 9/2004 | Dudley | B60H 1/00585 73/40.7 |
| 2010/0263882 A1* | 10/2010 | Bodemann | A62C 35/62 169/17 |

* cited by examiner

LARGE VOLUME TEST APPARATUSES AND METHODS FOR DETECTION OF SMALL DEFECTS

FIELD

The present disclosure relates generally to apparatuses and methods designed to obtain precision flow measurements for use in accurately detecting very small leaks.

BACKGROUND

Leak detection and flow measurement capabilities are often used to determine and quantify the presence of leaks typically on the micro-meter (nm) scale or less. Such precision is often important to determine whether an article is suitable for certain applications, such as for medical research, and to perform sterile products container closure integrity testing.

Testing for leak integrity is important in various industries because a product's failure may present significant hazards (e.g., to customers, patients, and healthcare professionals). In some applications, leak detection needs to address special industry specific requirements, such as being performed on all products and, thus, must be done without being destructive or corrosive to parts tested.

However, many products—such as many of those used in the medical industry—comprise materials that are flexible and elastic and, thus, may expand as gasses are used to detect leaks.

To perform such precise leak detection and flow measurements, a supply source with sufficiently stable pressure is therefore often needed. With conventional systems, such supply sources often incorporate a precision constant pressure vessel (e.g., an accumulator) that can be used to supply gas (e.g., air, nitrogen, oxygen, hydrogen, or a tracer gas). Conventional systems typically require that the precision constant pressure vessel be ten times or more larger than the volume of the product being tested. This can present challenges for testing larger volume products and, in some cases, be prohibitive due to the increased equipment, space, and cost requirements, especially in a "clean room" environment. Moreover, requiring such large volumes can increase the time required to test large units under test ("UUTs").

Furthermore, such systems may not be portable and, thus, may not allow for verification that a product meets desired specifications upon delivery to a customer or to an end user at the point-of-use. In other words, the UUTs may not be able to be tested to ensure they were not damages during shipping and/or storage with conventional systems.

Accordingly, systems and methods capable of precision testing of large volume items and/or more portable systems are still needed.

SUMMARY

Thus, disclosed herein are systems and methods for detecting leaks designed to obtain precision flow measurements for use in accurately detecting very small defects in large volume UUTs.

In one embodiment, a system for detecting leaks is disclosed comprising an accumulator, a flow controller in communication with the accumulator, and a flow sensor in communication with the accumulator, the flow controller and a UUT, wherein the flow sensor is structured to supply gas from the accumulator to the UUT and measure a flow rate of the supplied gas, the flow sensor providing feedback to the flow controller representing the flow rate, and the flow controller responding to the feedback by supplying flow compensation gas to the accumulator to maintain a desired pressure in the accumulator. In one aspect of this embodiment, the flow sensor is a micro-flow sensor. In another aspect, the flow sensor is an intelligent gas leak sensor ("IGLS"). In yet another aspect, the system comprises a pressure controller in communication with a quick fill valve, wherein the pressure controller cooperates with the quick fill valve to fill the UUT in response to feedback from a pressure sensor of a measurement of pressure of gas in the UUT. In a variant, this aspect further comprises a gas supply connected to the pressure controller. In a further variant, the pressure sensor is in communication with the quick fill valve. In another aspect, the system is a portable unit. In another aspect, the flow rate of the supplied gas corresponds to a defect in the UUT. Still another aspect further comprises a gas supply in communication with the pressure controller. Another aspect further comprises a fill valve in communication with the accumulator. In a variant of this aspect, the fill valve allows a gas supplied from the accumulator to bypass the flow sensor. In yet another aspect, the accumulator has an internal volume less than about 0.5 m$^3$.

In another embodiment, the disclosure provides a method for detecting leaks comprising supplying a UUT with a gas supplied through both a pressure controller and an accumulator, supplying the UUT with a gas supplied through a flow sensor, ceasing the supplying the UUT with the gas supplied from the pressure controller, supplying the UUT only with a gas supplied through the flow sensor, and determining whether a leak exists in the UUT in response to gas supplied through the flow sensor. One aspect of this embodiment further comprises supplying the UUT with a gas supplied from a quick fill valve in communication with the pressure controller. In another aspect, the gas supplied through the flow sensor is supplied from the accumulator. In a variant of this aspect, the gas supplied from the accumulator is supplied from a flow controller to the accumulator, the flow controller supplying gas from to the accumulator in response to a flow rate measured by the flow sensor. In another aspect, the gas supplied from the pressure controller is supplied from a mechanical regulator. In still another aspect, the gas supplied from the pressure controller is measured by a pressure sensor. In a variant of this aspect, the pressure sensor provides feedback to the pressure controller for regulating the gas supplied from the pressure controller. In another aspect, the gas supplied from the accumulator is supplied from the pressure controller to the accumulator. In a variant, the gas supplied from the accumulator is also supplied from a flow controller to the accumulator. In another aspect of this embodiment, the flow sensor is in communication with a flow controller.

In still another embodiment, the present disclosure provides a method of detecting leaks using flow measurement, comprising providing gas from an accumulator to a UUT through a micro-flow meter, wherein the accumulator has a volume that is equal to or smaller than a volume of the UUT, and measuring a leakage flow rate of the UUT using the micro-flow meter. One aspect of this embodiment further comprises providing compensation gas to the accumulator by a flow controller, the compensation gas being provided in response to a leakage flow rate of the UUT to compensate for gas discharged from the accumulator to maintain very constant pressure in the accumulator. Another aspect further comprises isolating the accumulator during measuring a leakage flow rate to avoid pressure fluctuations of the gas provided from the accumulator.

BRIEF DESCRIPTION OF THE DRAWINGS

The above mentioned and other features and objects of this disclosure, and the manner of attaining them, will become more apparent and the disclosure itself will be better understood by reference to the following description of an embodiment of the disclosure taken in conjunction with the accompanying drawings, wherein.

Figure 1:
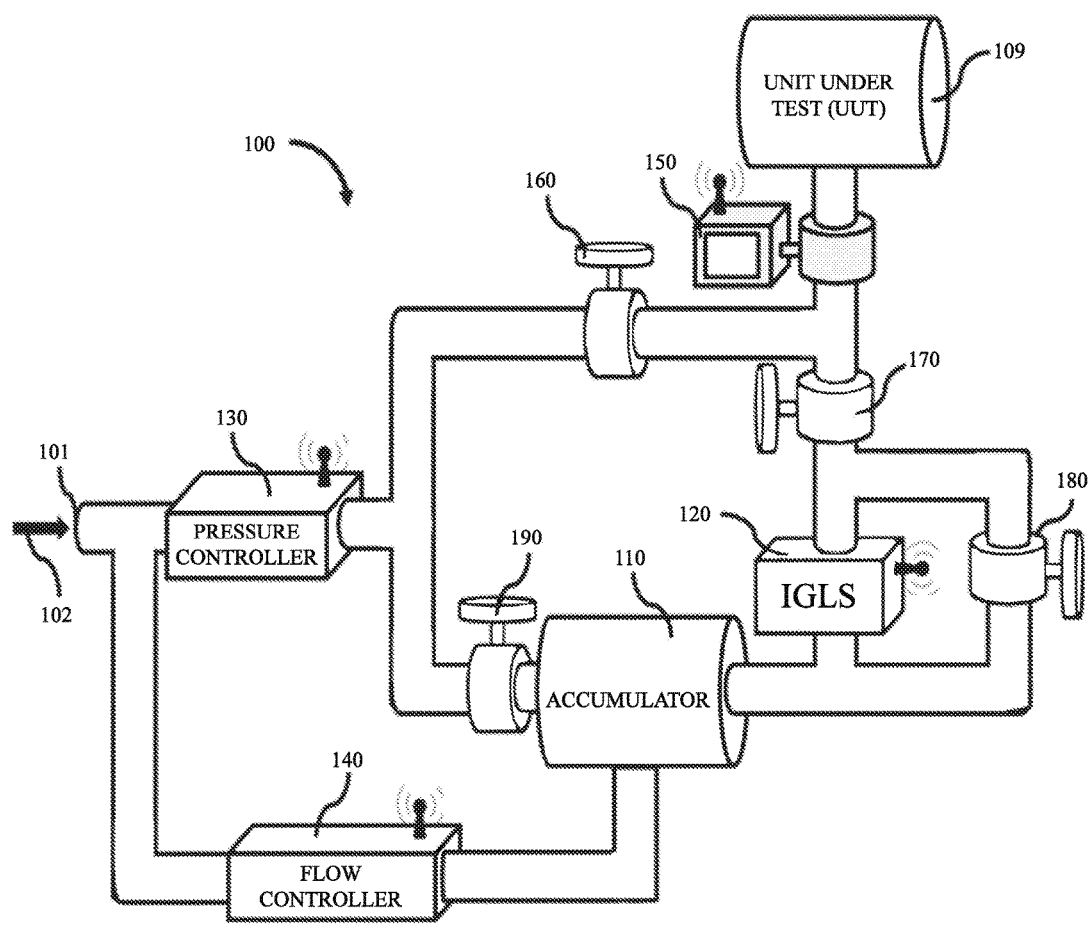
FIG. 1 illustrates a leak detection system according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize their teachings.

As used herein, the term small leak, may include leaks resulting from small defects—which includes micro-meter defects. In order to measure air flow through small defects, a very sensitive micro-flow meter may be used. An example of such a flow meter is the Intelligent Gas Leak Sensor ("IGLS") disclosed in in U.S. Pat. No. 5,861,546 to Sagi et al., and/or U.S. Pat. No. 6,308,556 to Sagi et al. (collectively, "the Sagi patents"), the disclosures of which are hereby expressly incorporated herein by reference. Other microflow meters or sensors operating in one or more flow regimes may also be used. Mathematical models used to determine the presence of a leak or defect are not particularly limited any may include any conventionally known method, including methods disclosed in U.S. Pat. No. 5,861, 546. The measurement principle of the present disclosure is to measure the air flow into the UUT that replaces the air lost through the leak, based on the mass conservation law. Hereinafter, although other suitable flow meters are contemplated by the present disclosure, the example of the IGLS will be described.

When measuring leakage from a UUT with a large volume, a small leak will result in a small pressure drop, which in return will force air through the IGLS as described below. To assure that the air flow is indeed a result of the leakage, a very constant pressure supply to the IGLS is desirable. The qualifier "very constant" is intended to mean including pressure changes that are generally smaller than the pressure changes due to the leakage from the UUT.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

One of ordinary skill in the art will realize that the embodiments provided can be implemented in hardware, software, firmware, and/or a combination thereof. Various sensors, controllers, and other computers within the various embodiments disclosed herein may include various programming codes that may be implemented in any viable programming language such as C, C++, MATLAB, HTML, XTML, JAVA or any other viable high-level programming language, or a combination of a high-level programming language and a lower level programming language. For example, the pressure controllers and flow controllers may contain or may be in communication with a proportional-integral-derivative controller ("PID controller") with any of the aforementioned programming languages.

FIG. 1 illustrates system 100 capable of testing a unit under test ("UUT") 109 for small defects or leaks. System 100 may include an expansion tank or accumulator 110, an intelligent gas leak sensor ("IGLS") 120 in communication with the accumulator 110, a pressure controller 130 in communication with the IGLS 120, a flow controller 140 in communication with the IGLS 120, and a pressure sensor 150 in communication with the pressure controller 130.

As used herein, the term "communication" is not particularly limited and may include mechanical, flow communication (e.g., fluid flow communication), electrical communication, or mixtures thereof. As used herein, the term electrical communication is not particularly limited an may include, for example, wired communication or wireless communication, such as radio, infrared, microwave, wireless local area network or Wi-Fi, or short-wavelength ultra-high frequency radio waves, such as Bluetooth. For example, system 100 is illustrated with pressure controller 130, flow controller 140, IGLS 120, and pressure sensor 150 being configured to communicate wirelessly.

Accordingly, system 100 is not particularly limited and, in various embodiments, system 100 may be a fixture in a building. In other embodiments, system may be a portable unit, which may allow for testing not only at the point-of-production (e.g., at the manufacturers site), but may also allow for product testing at another location (e.g., when accepting delivery of products or in the field at the point-of-use). Thus, portable devices may allow for improved certainty at receiving docks when determining whether to accept or deny a shipment. Furthermore, portable systems may allow for improved certainty at the point-of-use, for example to ensure a sterile environment.

In various embodiments, pressure controller 130 and flow controller 140 may be connected to a gas supply. For example, system 100 illustrates a gas supply flow 102 entering gas supply inlet 101 from a gas supply, such as mechanical regulator (not shown in FIG. 1). In some embodiments, flow controller 140 may be in communication with the accumulator 110 and may help to maintain a constant pressure or near constant pressure within accumulator 110, for example, when the UUT is undergoing a test.

System 100 may also comprise a quick fill valve 160, which may allow the UUT 109 to be filled directly with gas supplied through pressure controller 130. In some embodiments, the pressure sensor 150 may be in communication with the quick fill valve 160. System 100 as shown also includes a test valve 170 between IGLS 120 and UUT 109.

System 100 may also comprise an isolation valve 190, which may allow or restrict gas supply from the pressure controller 130 to the accumulator 110. Thus, when in the open position, isolation valve 190 will allow gas supplied through the pressure controller 130 to enter the accumulator 110. Also, in various embodiments, flow controller 140 may also supply gas to accumulator 110.

System 100 may also comprise a fill/by-pass valve 180 that may allow gas supplied from the accumulator 110 to bypass the IGLS 120 and enter into the UUT 109. Thus, fill/by-pass valve 180 may be connected to the accumulator 110.

Furthermore, the various valves and controllers are not particularly limited and may include mechanical valves, mechanical sensors, electrical valves, electrical sensors, or combinations thereof.

Pressure sensor 150 may be positioned near the UUT 109 and may monitor the pressure of the UUT. Thus, in various embodiments, when the UUT 109 is being filled quickly, filled under a normal flow rate, filled slowly, or being tested, the pressure sensor 150 may help to monitor, control, and/or ensure the pressure of the supply to the UUT 109 remains within a desired pressure range.

Thus, system 100 may allow for the UUT 109 to be filled quickly without using gas supplied from the accumulator 110. By filling a significant portion of the UUT 109 without using gas supplied through the accumulator 110 before testing, the amount of gas supplied through the accumulator 110 may be reduced and, thus, reduce the pressure fluctuations within accumulator 110, for example, from turbulent airflow.

Reducing the pressure fluctuations within accumulator 110 may allow for smaller and more compact systems than conventional systems. This may not only allow for improvements such as reduction of space needed for such systems and material cost savings, but may also allow for such systems to fill much larger UUTs without increasing the size of the accumulator 110. Thus, while some conventional systems require an accumulator 110 ten or more times the size of the unit under test, the systems within the scope of this disclosure may allow for accumulators with reduced internal volumes. Thus, in some embodiments, the accumulator 110 may have an internal volume less than twice the volume of UUT 109, and in certain embodiments, a fraction of the UUT volume. In one example, if the UUT volume is 200 liters, then the accumulator volume may be less than 50% of that volume.

Thus, the various systems disclosed herein allow for improved methods for detecting small leaks in apparatuses with large volumes (e.g., larger than 50 liters, such as volumes between about 50 liters and 3,500 liters). Furthermore, it should be noted that while the systems and methods disclosed herein may be used to test apparatuses having large volumes, they may also be used with apparatuses with smaller volumes.

Moreover, the IGLS 120 may measure the gas that passes from the accumulator 110 into the UUT 109. By measuring the gas supplied, the IGLS 120 may monitor and/or control the pressure controller 130 and/or the flow controller 140 to provide flow into accumulator 110 proportional to the flow exiting from accumulator 110 into the IGLS 120, resulting from a defect or leak in the UUT 109. In various embodiments, the flow commanded to flow controller 140 may be equal to, smaller than, or greater than the flow rate measured by the IGLS.

When constant pressure at the accumulator 110 is maintained, the IGLS 120 may be able to measure the flow rate into the UUT 109 and, thus, may test for a small leak. Thus, the gas that is supplied through the IGLS 120 may be supplied from the accumulator 110. Moreover, the gas supplied from the accumulator 110 may be supplied from the flow controller 140 to the accumulator 110.

Thus, in various embodiments, the accumulator 110 may be isolated to prevent pressure ripples from the supply from adversely affecting the pressure in the accumulator 110 and, thus, through the IGLS 120.

In one test sequence, an initial quick fill process is executed to bring the UUT 109 to a nearly filled state rapidly. In this step, isolator valve 190, fill/by-pass valve 180 and test valve 170 are closed. Supply gas is provided through pressure controller 130 and quick fill valve 160 to the UUT 109. Pressure sensor 150 indicates to pressure controller 130 when UUT 109 approaches a filled state. Next, a fill process is executed, wherein all of the valves are opened such that gas flows to UUT 109 from pressure controller 130 through quick fill valve 160 and from pressure controller 130 through accumulator 110 and IGLS 120. During this step, flow controller 140 does not provide flow compensation to accumulator 110.

When pressure sensor 150 indicates that UUT 109 is filled with gas, system 100 executes a stabilization process wherein all valves are closed except test valve 170 and flow controller 140 provides flow compensation to accumulator 110. In this manner, IGLS 120 measures flow to UUT 109 as UUT 109 stabilizes and provides the flow information to flow controller 140. Flow controller 140 uses this feedback to provide a similar flow as compensation to accumulator 110. When the flow through IGLS 120 stabilizes, the system 100 executes a measurement of the flow rate through IGLS 120 which represents the existence and extent of a defect or leak in UUT 109 in a manner disclosed in the Sagi patents.

Figure 2:
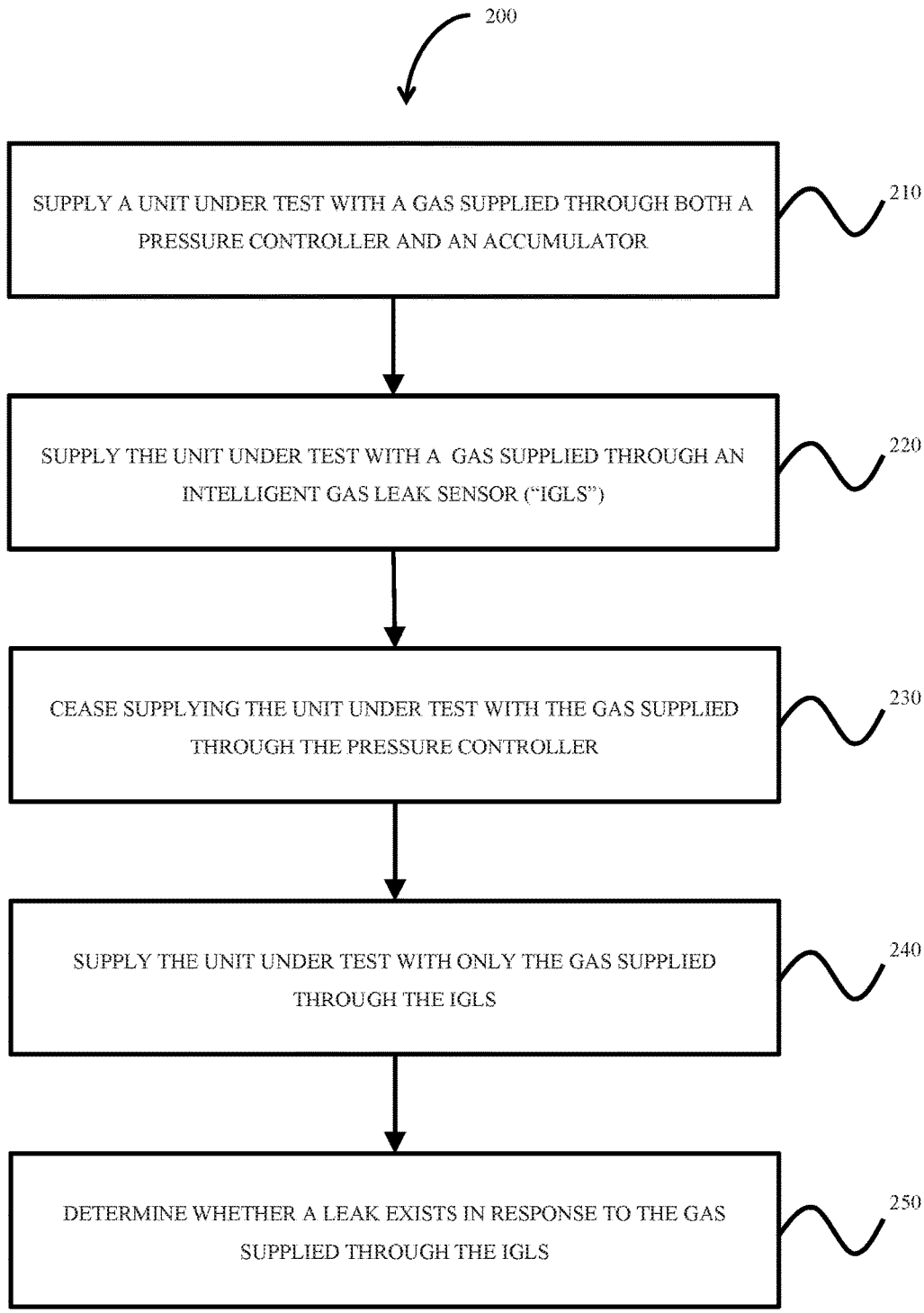
FIG. 2 illustrates method for detecting a small leak according to various embodiments.

FIG. 2 illustrates method 200 for testing a UUT for a small leak. Method 200 may include supplying a UUT with a gas supplied through both a pressure controller and an accumulator (step 210). The gas supplied to the pressure controller is not particularly limited and may be supplied from a mechanical regulator.

Method 200 also may include supplying the UUT with a gas supplied through an intelligent gas leak sensor ("IGLS") (step 220), ceasing supplying the UUT with the gas supplied from the pressure controller (step 230), and supplying the unit under test only with a gas supplied through the IGLS (step 240). In various embodiments, gas supplied to the IGLS may be supplied gas that passes through an accumulator.

The gas supplied to the accumulator is not particularly limited and may be supplied from the pressure controller to the accumulator and/or may be supplied from a flow controller to the accumulator. In one embodiment, a flow controller supplies gas to the accumulator in response to feedback from the IGLS indicating the flow rate of gas being supplied to the UUT.

Method 200 also includes determining whether a leak exists in response to the gas supplied through the IGLS (step 250). In various embodiments, the IGLS may be able to determine the presence of a leak based on flow through the IGLS to the UUT.

Figure 3:
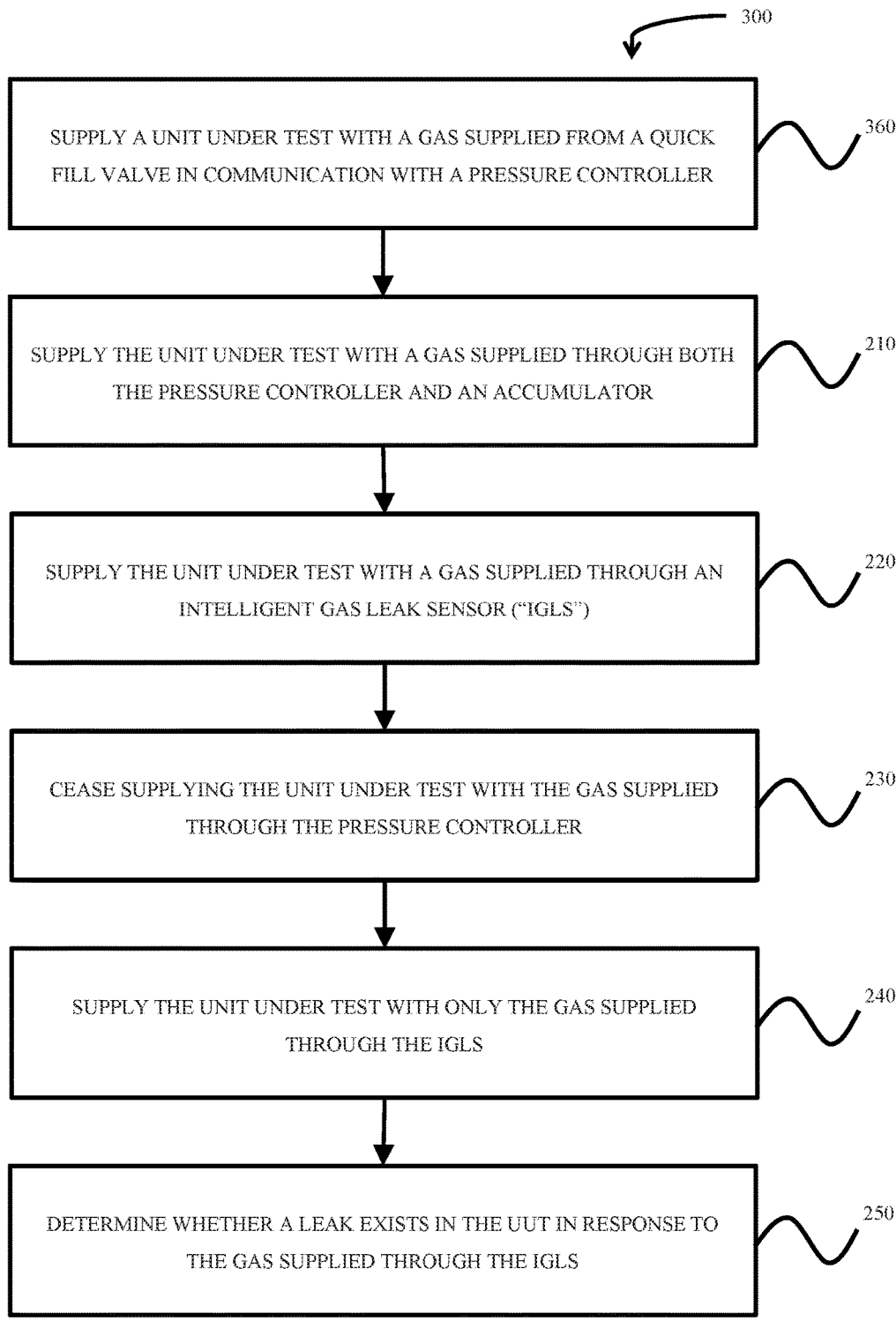
FIG. 3 illustrates a quick fill leak detection method according to various embodiments.

The order of the steps disclosed herein are not particularly limited and, thus, may vary from those exemplified in FIGS. 2 and 3. For example, with continued reference to FIG. 2, the supplying of the UUT with a gas supplied through an IGLS (step 220) may come after the supplying of the UUT with the gas supplied through the pressure controller and the accumulator has ceased (step 230).

Method 300 exemplified in FIG. 3 may also include the additional step of supplying the UUT with gas supplied from a quick fill valve in communication with the pressure controller (step 360). According to various embodiments, filling the UUT with a gas supplied from a quick fill valve in communication with the pressure controller may allow for the system to fill the UUT bypassing the accumulator, such as accumulator 110 exemplified in FIG. 1.

This may help to reduce the turbulence in accumulator 110, and may allow the test time to be reduced and/or the size of the accumulator to be reduced. As described above, the gas supplied from the pressure controller—for example during a quick fill—may be measured by the pressure sensor. Also, the pressure sensor may assist in regulating the pressure controller and, thus, may ensure that the supplying of gas to the UUT does not damage the UUT. In some methods, using the quick valve may allow the UUT to arrive near the test pressure rapidly and reduce the required test time.

While this disclosure has been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more."

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for detecting leaks comprising:
an accumulator;
a flow controller in communication with the accumulator; and
a flow sensor in communication with the accumulator, the flow controller and a UUT;
wherein the flow sensor is structured to supply gas from the accumulator to the UUT and measure a flow rate of the supplied gas, the flow sensor providing feedback to the flow controller representing the flow rate, and the flow controller responding to the feedback by supplying flow compensation gas to the accumulator to maintain a desired pressure in the accumulator.

2. The system of claim 1, wherein the flow sensor is a micro-flow sensor.

3. The system of claim 1, wherein the flow sensor is an intelligent gas leak sensor ("IGLS").

4. The system of claim 1 further comprising a pressure controller in communication with a quick fill valve, wherein the pressure controller cooperates with the quick fill valve to fill the UUT in response to feedback from a pressure sensor of a measurement of pressure of gas in the UUT.

5. The system of claim 4 further comprising a gas supply connected to the pressure controller.

6. The system of claim 4, wherein the pressure sensor is in electrical communication with the pressure controller.

7. The system of claim 1, wherein the system is a portable unit.

8. The system of claim 1, wherein the flow rate of the supplied gas corresponds to a defect in the UUT.

9. The system of claim 1 further comprising a gas supply in communication with a pressure controller.

10. The system of claim 1 further comprising a fill valve in communication with the accumulator.

11. The system of claim 10, wherein the fill valve allows a gas supplied from the accumulator to bypass the flow sensor.

12. The system of claim 1, wherein the accumulator has an internal volume less than about 0.5 m$^3$.

13. A method for detecting leaks comprising:
supplying a UUT with a gas supplied through both a pressure controller and an accumulator;
supplying the UUT with a gas supplied through a flow sensor;
ceasing the supplying the UUT with the gas supplied from the pressure controller;
supplying the UUT only with a gas supplied through the flow sensor; and
determining whether a leak exists in the UUT in response to gas supplied through the flow sensor.

14. The method according to claim 13 further comprising supplying the UUT with a gas supplied from a quick fill valve in communication with the pressure controller.

15. The method according to claim 13, wherein the gas supplied through the flow sensor is supplied from the accumulator.

16. The method according to claim 15, wherein the gas supplied from the accumulator is supplied from a flow controller to the accumulator, the flow controller supplying gas from to the accumulator in response to a flow rate measured by the flow sensor.

17. The method according to claim 13, wherein the gas supplied from the pressure controller is supplied from a mechanical regulator.

18. The method according to claim 13, wherein the gas supplied from the pressure controller is measured by a pressure sensor.

19. The method according to claim 18 wherein the pressure sensor provides feedback to the pressure controller for regulating the gas supplied from the pressure controller.

20. The method according to claim 13, wherein the gas supplied from the accumulator is supplied from the pressure controller to the accumulator.

21. The method according to claim 20, wherein the gas supplied from the accumulator is also supplied from a flow controller to the accumulator.

22. The method according to claim 13, wherein the flow sensor is in communication with a flow controller.

23. A method of detecting leaks using flow measurement, comprising:
   providing gas from an accumulator to a UUT through a micro-flow meter, wherein the accumulator has a volume that is equal to or smaller than a volume of the UUT;
   measuring a leakage flow rate of the UUT using the micro-flow meter; and
   isolating the accumulator during measuring a leakage flow rate to avoid pressure fluctuations of the gas provided from the accumulator.

24. The method according to claim 23, further comprising providing compensation gas to the accumulator by a flow controller, the compensation gas being provided in response to a leakage flow rate of the UUT to compensate for gas discharged from the accumulator to maintain very constant pressure in the accumulator.

* * * * *